Figure 1:
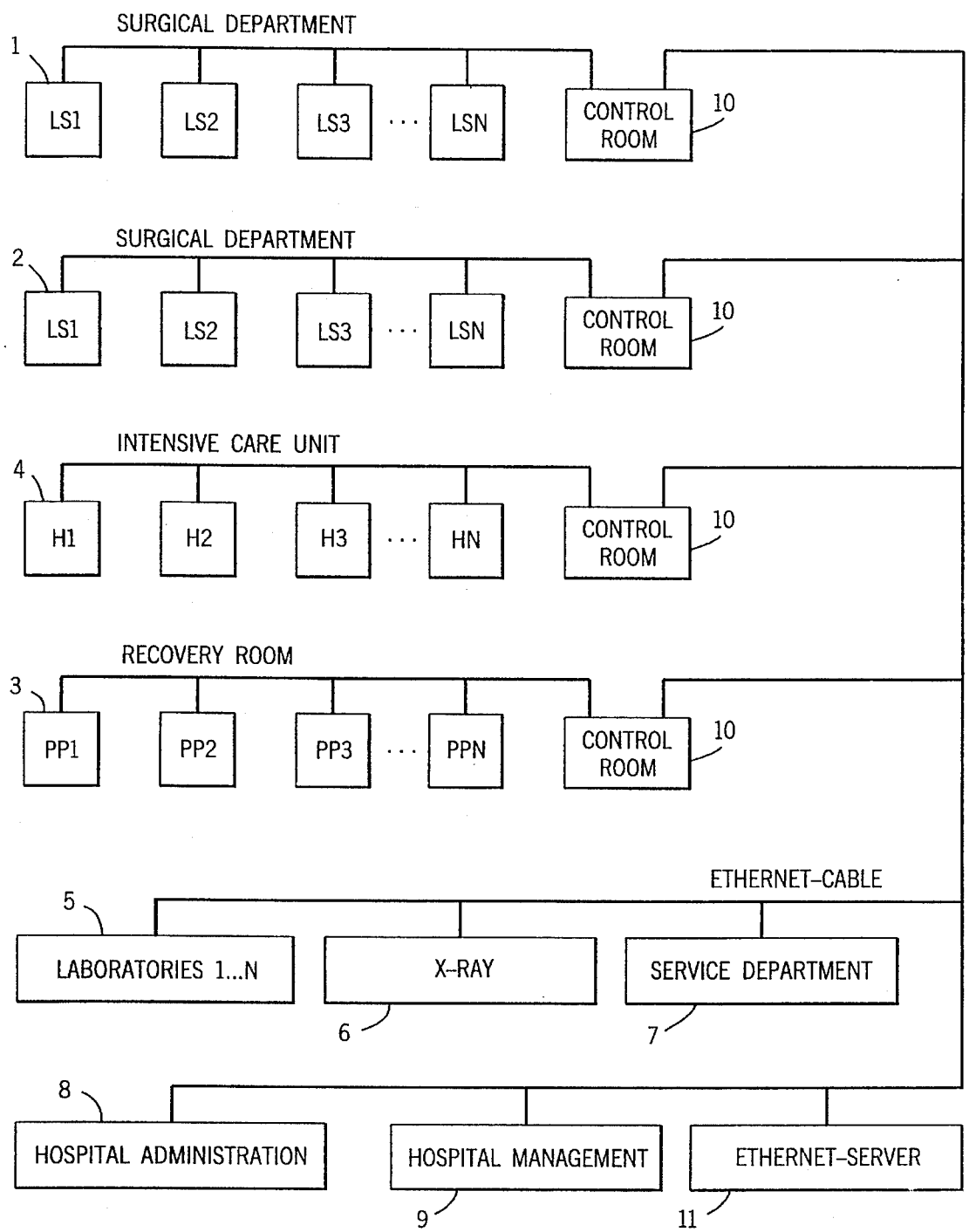

United States Patent [19]

Uotila

[11] Patent Number: 5,500,854
[45] Date of Patent: Mar. 19, 1996

[54] DATA TRANSMISSION SYSTEM AND EQUIPMENT

[75] Inventor: Pekka A. Uotila, Helsinki, Finland

[73] Assignee: Instrumentarium Corporation, Finland

[21] Appl. No.: 173,501

[22] Filed: Dec. 22, 1993

[30] Foreign Application Priority Data

Dec. 23, 1992 [FI] Finland .................................... 925859

[51] Int. Cl.$^6$ ................................................ H04L 12/24
[52] U.S. Cl. .................... 370/17; 370/85.1; 340/286.07; 340/825.49; 364/413.02
[58] Field of Search ............................. 370/85.1, 17, 92, 370/93; 340/825.36, 825.49, 286.07; 364/413.02

[56] References Cited

U.S. PATENT DOCUMENTS

| | | | |
|---|---|---|---|
| 3,573,739 | 4/1971 | Zeitlin | 340/825.49 X |
| 5,038,800 | 8/1991 | Oba | 128/904 |
| 5,072,383 | 12/1991 | Brimm et al. | 364/413.02 |
| 5,153,584 | 10/1992 | Engira | 340/825.49 X |
| 5,247,464 | 9/1993 | Curtis | 340/825.49 X |
| 5,319,363 | 6/1994 | Welch et al. | 340/825.36 |

FOREIGN PATENT DOCUMENTS 4041442  6/1992  Germany ..................... H04L 12/24

*Primary Examiner*—Douglas W. Olms
*Assistant Examiner*—Russell W. Blum
*Attorney, Agent, or Firm*—Andrus, Sceales, Starke & Sawall

[57] ABSTRACT

The object of the invention is a data transmission system for the identification of the location (20) of the data terminal equipment (16). The system comprises the data terminal equipment (16) which operates according to the instructions given by a program, the data network (13) for the transmission of the data between the data terminal equipment (16) and, data network connection points (18), adapted to forward communication, and to which there is a connection from the data terminal equipment, an element (14) linked to the data terminal equipment, correspondingly adapts the communication to be transferred to the data terminal equipment and network. The invention is characterized in that a coding element (15) can be linked to the data terminal equipment to be connected to the network, from which coding element the physical address of the equipment location (20) can be read into a transmittable communication.

22 Claims, 7 Drawing Sheets

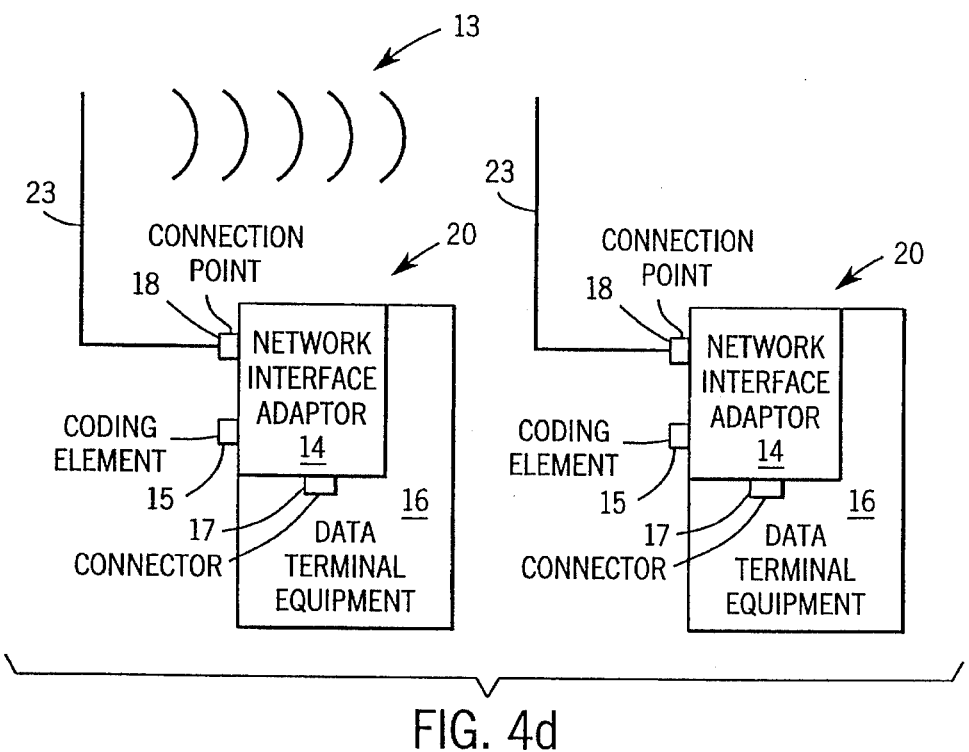
FIG. 4d
FIG. 5
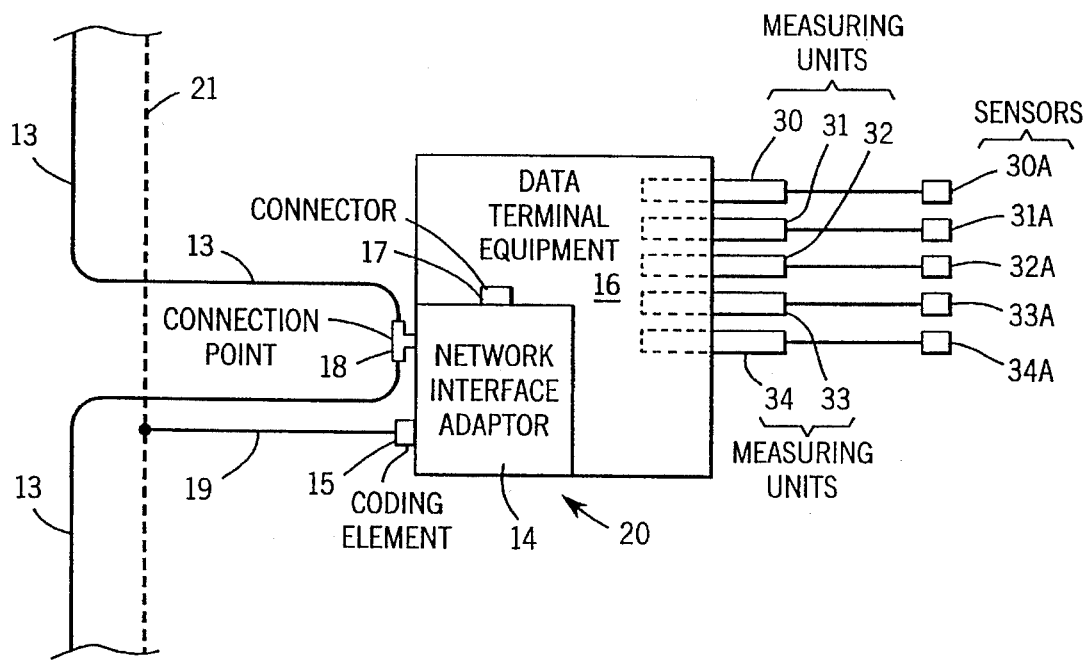

DATA TRANSMISSION SYSTEM AND EQUIPMENT

The object of the invention is a data network based data transmission system for defining the location of the data terminal equipment or corresponding elements connected to the data network.

The connection between several data terminals can be set up through the data network. Through the network the separate stations, work stations or operation sites can communicate, or intercommunicate, via the network. One of the data terminals connected to the network address can form the network server for the assembling of all data transmitted by the network data processors. One data transmission system is the Ethernet-network, defined in the standards ISO/IEC 8802-3:1992 (E) and IEEE 802.3 (1) 1990 (E). Also ring type data networks are available, as the Token Ring defined in the standard IEEE 802.5 1992 (E). The separate work stations in offices, departments, hospitals etc. intercommunicate through the data network. For the data network, a coaxial cable, optic fibre, a twisted pair, infrared or radio waves or other known connection can be used.

There can be one data network or several intercommunicating data networks. In small units, as in small hospitals, generally only one data network is used. When the hospital has several surgical departments with several operating rooms, recovery rooms or intensive care units in addition to other wards and the administration, several data networks are used, e.g. between the wards or the separate floors. FIG. 1 presents an example of a big hospital with recovery rooms in connection with or separated from the surgical department with several recovery beds. In the vicinity there are intensive care units with several intensive care beds. For the centralized monitoring of the different treatment sites within one ward, the sites are connected within the ward by the data network. If the wards also are to be connected to each other and to the hospital laboratories and the administration, this requires a separate data network with connections from other networks.

With the patient monitoring equipment 16 shown in FIG. 4, which also is the data terminal equipment, the patent's condition can be monitored during the surgery in the operating room, during the post-operative stage in the recovery room or during the intensive care in the intensive care unit with the help of measuring sensors, sampling hoses etc. attached to the patient. In the hospital the operating site is preferably a site where the patient's condition is monitored by a patient monitoring device.

Within the ward, the data of the patient monitor or a corresponding device is transferred to the network central processor, which can be e.g. the control room or a server, from which the operations of several patient monitoring devices can be supervised. The condition of the patients can thus be centrally monitored from one place. This central processor can also be a patient monitoring device. The operations of the other patient monitoring devices can also be supervised from the other network addresses.

When a patient monitoring device or other data terminal equipment linked to or to be linked to the network is moved, information about the new location of the equipment must be entered manually into the data terminal computer. The international Ethernet-code e.g. distinguishes only the equipment linked to the data transmission system from each other. It does not, however, identify the physical location of each device. The reliable follow-up of the data of the different treatment sites is therefore not possible, because the device can have been temporary moved to e.g. another patient without any information about the new location of the treatment site.

Nowadays the control room knows the location of the patient monitoring device, when the monitoring device has been given the location code of the operation site through a keyboard before starting the treatment of the patient. The patient monitoring device combines preferably the Ethernet-code and the location code logically and conveys this information to the control room. The location of the patient monitoring device is therefore unambiguously known to the control room. The entering of this location code presents a problem, because the starting of the treatment is usually urgent which might lead to an omission of the entry of the location code of the treatment site.

Confusion can also be caused by an incorrectly entered location code. This can lead to disorder in the control room as to the location of the patient monitoring device. An additional problem arises when the patient and the monitor connected to him are moved to the recovery room, to the intensive care unit, or elsewhere in the ward after the surgery. The new location of the monitor equipment must always be entered after the moving by the keyboard linked to the monitor.

Accordingly, one of the objects of the invention is to provide a system for the definition of the physical location data of the data terminals connected to or to be connected to the data network.

An additional object of the invention is to reduce the routine tasks of the staff.

An additional object is to reduce the amount of incorrect information about the location of the equipment linked to the data network.

An additional object of the invention is to facilitate the tracing of the patient monitors, especially in places, as in hospitals, where the same equipment can be used in several different operating sites. The entering of the location data becomes unnecessary.

An additional object of the invention is to save costs by enabling the monitoring of data measured from several patients simultaneously in the control room.

A further object of the invention is to provide a means giving the location information said means being detached from the network and the network connection points. Thus replacement of the network or network connection points is not necessary when employing the present invention.

FIG. 1 presents a diagram of a data transmission system generally in use in hospitals.

Figure 2A:
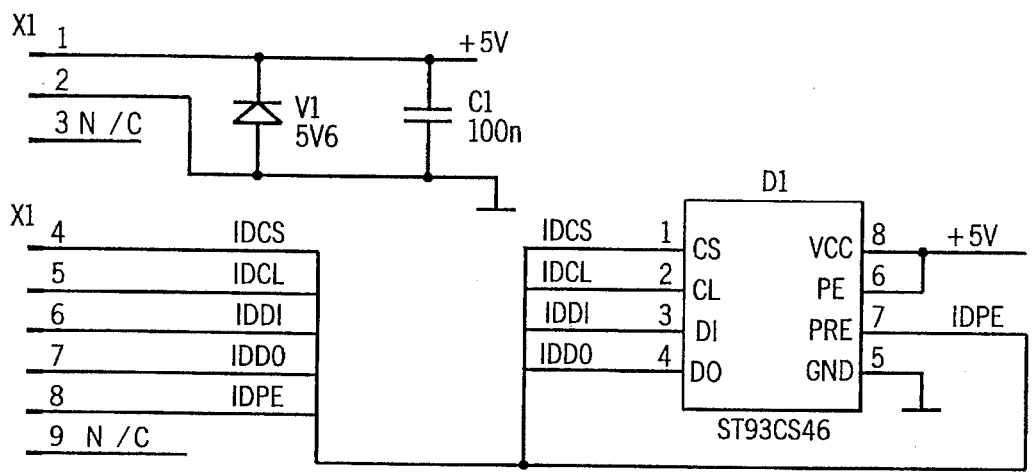

FIG. 2a presents a coding element based on serial access memory.

Figure 2B:
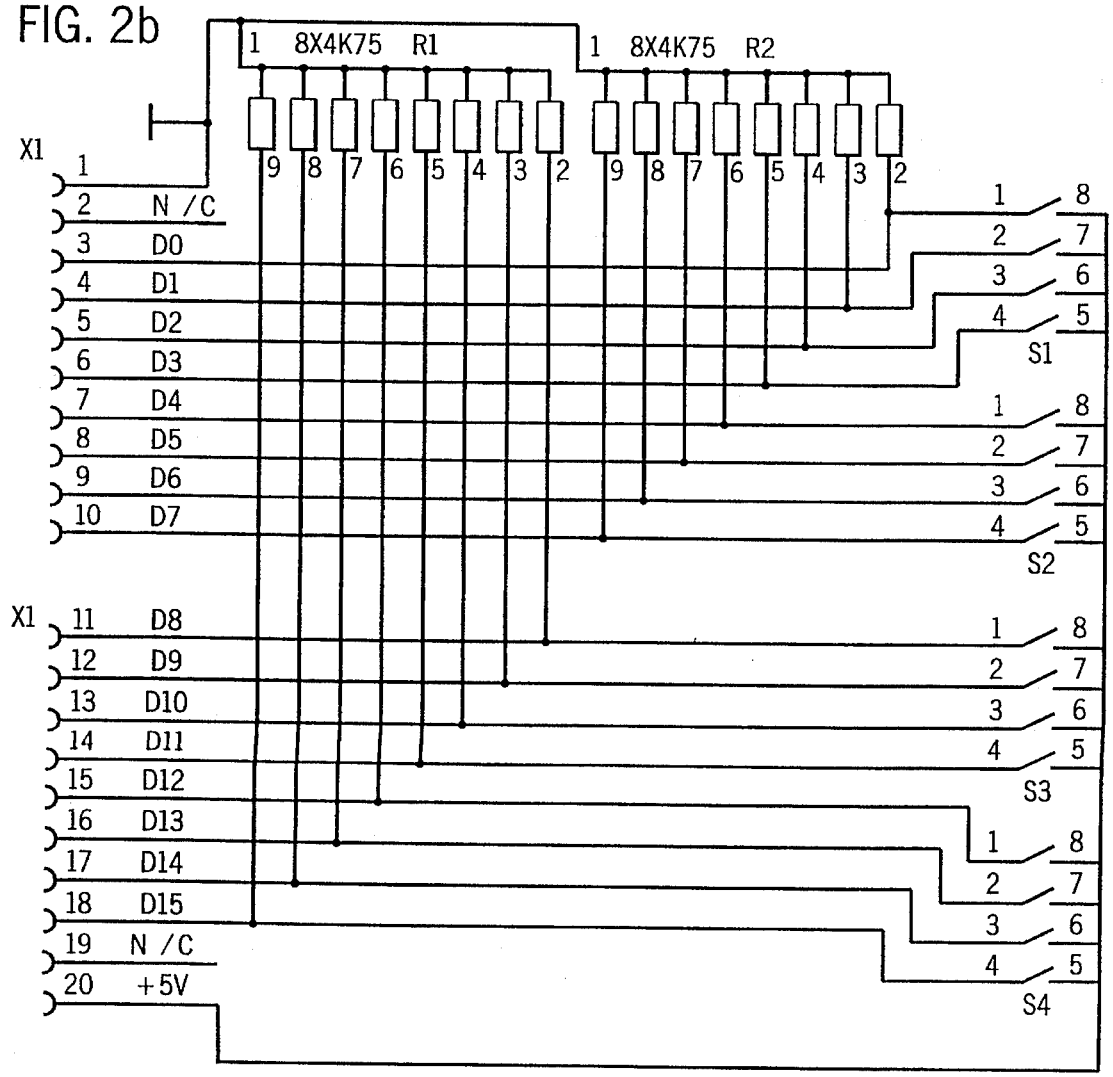

FIG. 2b presents a coding element based on parallel access.

Figure 3A:
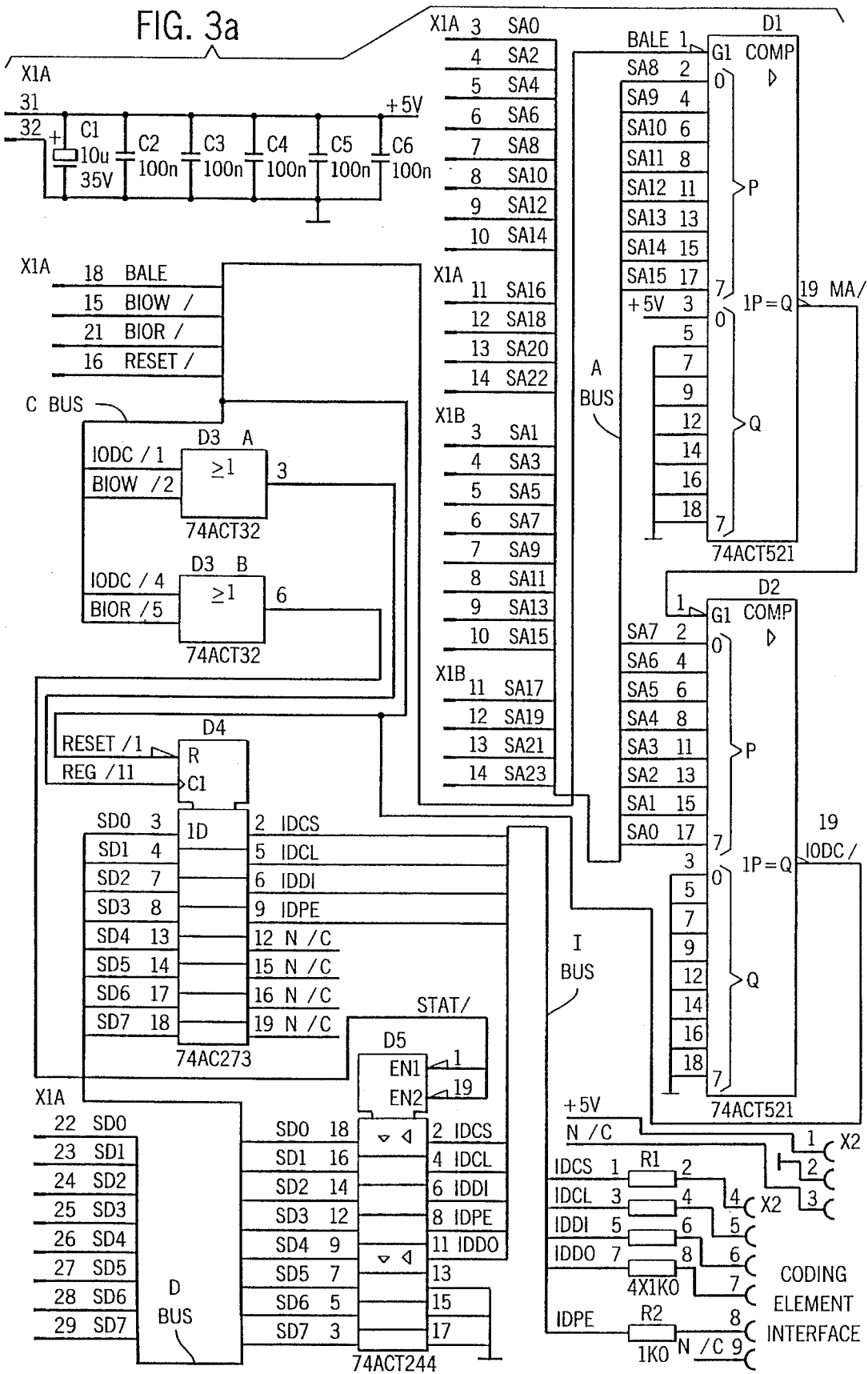
Figure 3B:
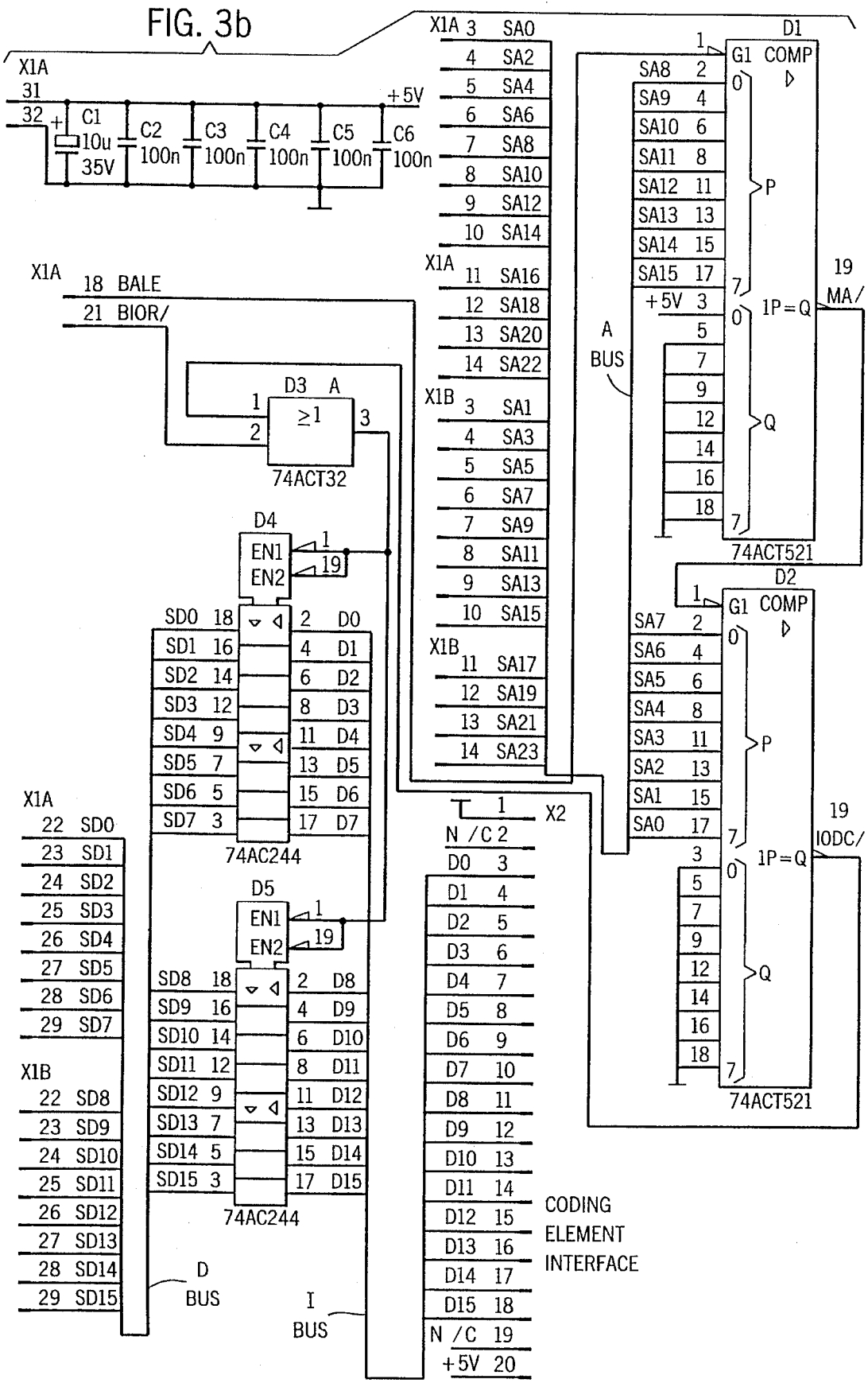

FIG. 3a and 3b present the interface logic, by which the coding element is connected through the X2-connector to the data terminal equipment.

FIG. 4a–d present different forms of implementation of the linking of the coding element to the data terminal equipment in different network solutions forming part of the data transmission system.

FIG. 5 presents a basic picture of parts to be linked to the patient monitor for producing data to be transferred to the data network.

FIG. 1 presents a diagram of the general structure of a hospital. The hospital comprises the surgical departments 1, 2, the recovery room 3, the intensive care unit 4, the laboratories 5, the X-ray department 6, the service department 7 as well as the hospital administration 8 and hospital management 9.

LS1, LS2 . . . LSN represent the operating rooms and 10 the control rooms, to which the control data from the operating rooms is transmitted through the data network. H1, H2 . . . HN and PP1, PP2 . . . PPN depict rooms or beds. The server used jointly by the network work stations has been marked with number 11. In big hospitals, a separate data network has preferably been built within the surgical departments 1, 2, the recovery rooms 3 and the intensive care units 4, in order not to load the hospital's other data network with the constant data transmission from the patient's treatment site. The separate data networks can be substituted by one data network especially in cases where the hospital's data network is not heavily loaded. Each of the above mentioned departments can have their own control rooms, which are linked to each other and to the other data transmission systems of the hospital. FIG. 1 presents an own internal network for each surgical department or recovery room. The reason for this is that the amount of the patient control data is considerable, and without a separate data transmission network, the speed of the data transmission might not be sufficient. The picture does not present the different hospital wards, as the surgical ward. These can be linked to the data network if required.

The intensive care unit or the recovery department might further comprise several treatment sites, which, however, have different treatment codes in the data network. The location site is a location site at which connection can be made by the data terminal equipment to the network via the connection point, having a coding element bound to the location and containing a predetermined and readable address. The interface point is the network point to which the data terminal can be connected.

When the patient monitor has been connected to the data network, the data obtained from it can also be read in the control room 10. In order distinguish in the control room each patient monitor linked to the data network from other monitors, each patient monitor has to have its own identity code. The location data of the treatment site has to be given manually. This might be difficult and subject to mistakes.

An improvement has been made in this respect. Each patient treatment site, which can be i.a. in the operating room, in the recovery room, in the intensive care unit, etc. is given an own location code, e.g. a binary code, which is stored in the so called coding element. As storage media for the code in the coding element can be used e.g. a parallel or serial based access memory, coding switches, or alike.

At the treatment site after the switching on of the data terminal equipment, the data terminal reads the predetermined location code of the treatment site from the coding element as well as the network code, which preferably is a Ethernet-code. The data terminal equipment is a terminal device or equipment or a total work station, with a connection to the computer or which itself operates as a computer or preferably as a patient monitoring device.

FIG. 2a presents a coding element based on a certain serial access memory, by which the symbols and names of the control lines relates to this memory or to other well known manufacturers' compatible semiconductor elements. The coding element is linked to the data terminal with the connector X1, the operating voltage is fed to the circuit and the operation of the serial based access memory D1 is controlled. The control lines are depicted by IDCS, which is the serial access memory's selection line, the IDCL is the clock line of the memory chip input/output data, IDDI the input data line, IDDO the output data line and IDPE the protection permission line. V1 is the operating voltage transient protection and C1 is the filter capacitor.

When reading from the serial based access memory, the IDCS is initially set in "1" state and on the IDCL ascending margins is clocked on the IDDI-line serially a start character, which is "1", a two-bit operation code indicating reading and a 6-bit address, from which the data is read. Thereafter, when the IDCS is in "1"-state, on the IDCL ascending margins, from a 6-bit storage location indicating the address, is serially clocked a 16-bit data via the IDDO to be read by the data terminal equipment. When writing into the serial access memory, the IDCS is initially set in "1" state and on the IDCL ascending margins is clocked on the IDDI-line serially a start character, which is "1", a 2-bit operation code indicating writing and a 6-bit address, to which the data is stored. After this, when the IDCS is in "1" state, on the IDCL ascending margins to a 6-bit storage location indicating the address, is serially clocked a 16-bit data via the IDDI to be stored from the data terminal equipment in the memory. If the stored data is to be protected, this is done when the IDCS and IDPE are in "1" state and by clocking on the IDCL ascending margins certain operation codes into the memory chip.

FIG. 2b presents a 16-bit coding element implemented with switches. The word width is easy to add or reduce according to need. The coding element is linked to the data terminal equipment with the connector X1, the operating voltage is fed to the switching and the location code encoded in the switches is read. D0–D15 are the data lines through which the location code encoded in the switches S1–S4 are relayed from the switches to the X1 adapters. R1 and R2 are pulldown resistors. When the switch is open, the data line settles in the logical "0" state and when the switch is closed, the corresponding data line settles in the "1" state. When the data terminal equipment reads the contents of the coding element, it is up to the data terminal how it interprets the location code. The most common method is to use the 16-, 10- or 8-system of numerical notation. Also other data coding methods can be used.

FIG. 3a presents in principle the connecting of a coding element based on serial access memory through the interface adapter to the mother boards made of Intel Corp.'s known 80X86-series processors. The data is transferred in the circuits in a known way such as through the DBUS to be read by the processor. ABUS depicts the address bus, CBUS the control bus and IBUS the coding element control bus. The interface adapter is linked to the processor mother board through the connector X1. The coding element is linked to the interface adapter through the connector X2. The resistors R1 and R2 are safety resistors. The capacitors C1–C6 operate as filter capacitors. The circuits D1 and D2 are the address comparators, by which the processor address bus is supervised. When there is an address 100 (hexa) in the address bus and the BALE-line is in "0" state, i.e. the address is stable, the IODC/-line settles into "0"-state. If the processor makes a writing reference to the IO-area 0-FFFF (hexa), the BIOW/-line settles in "0"-state, by which the OR-gate D3 output pin 3 settles in "0" state. At the end of the IO-cycle the BIOW/-line settles in "1" state, by which the circuit D3 output pin 3 settles back in "1" state and the data contained in the register D4 input lines SD0–SD7 is clocked in the D-register output of the D4-circuit, where it is saved until changed again. When the current is switched on, the down-active pulse in the RESET/-line resets the circuit D4 output into "0" state. If the processor makes a reading reference to the IO-area, the BIOR/-line settles in "0"-state. By this the D3 output pin 6 settles in "0" state, the D5 output of the buffer exits the three-state mode and starts following the circuit input lines. At the end of the IO-cycle the processor reads the data contained in the SD0–SD7 data lines. And finally at the end of the IO-cycle the BIOR/-line settles in "1"-state and the D3 circuit output pin 6 settles "1", resulting in that the output of the circuit D5 again settles in the three-state mode.

FIG. 3b presents in principle the connecting of a 16-bit coding element based on parallel access through the interface adapter to the mother boards made of Intel Corp.'s known 80X86-series processors. The interface adapter is linked to the processor mother board through the connector X1. The coding element is linked to the interface adapter through the connector X2. The adapter is only given a 16-bit IO-reading reference to the address 100 (hexa).

Figure 4A:
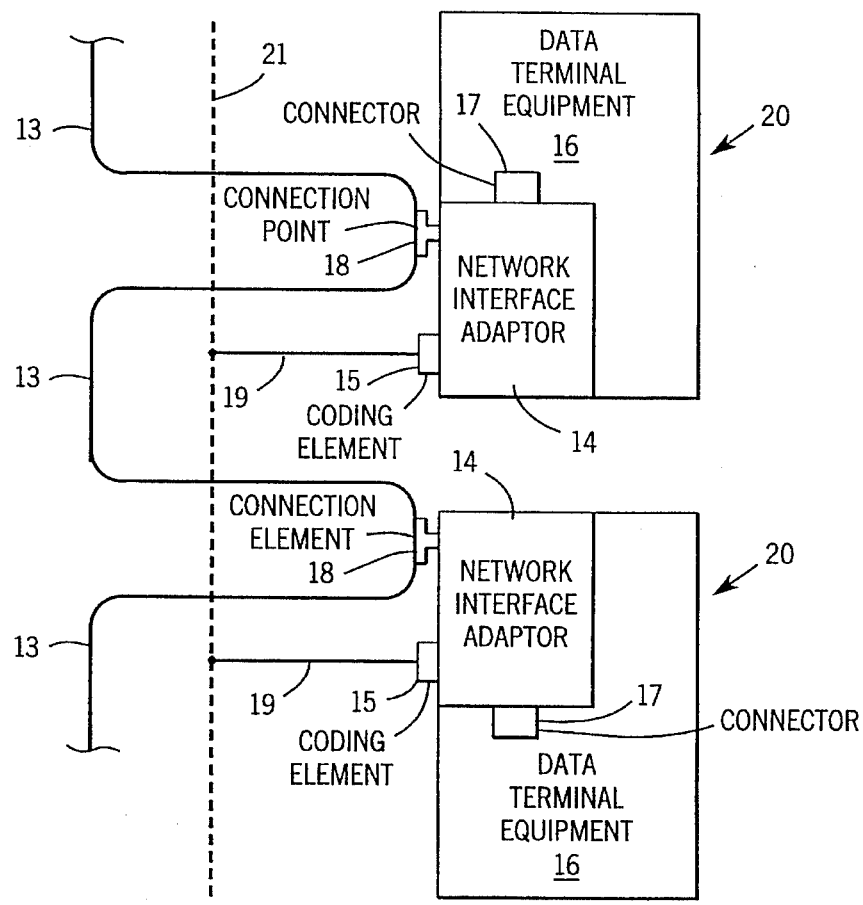
Figure 4B:
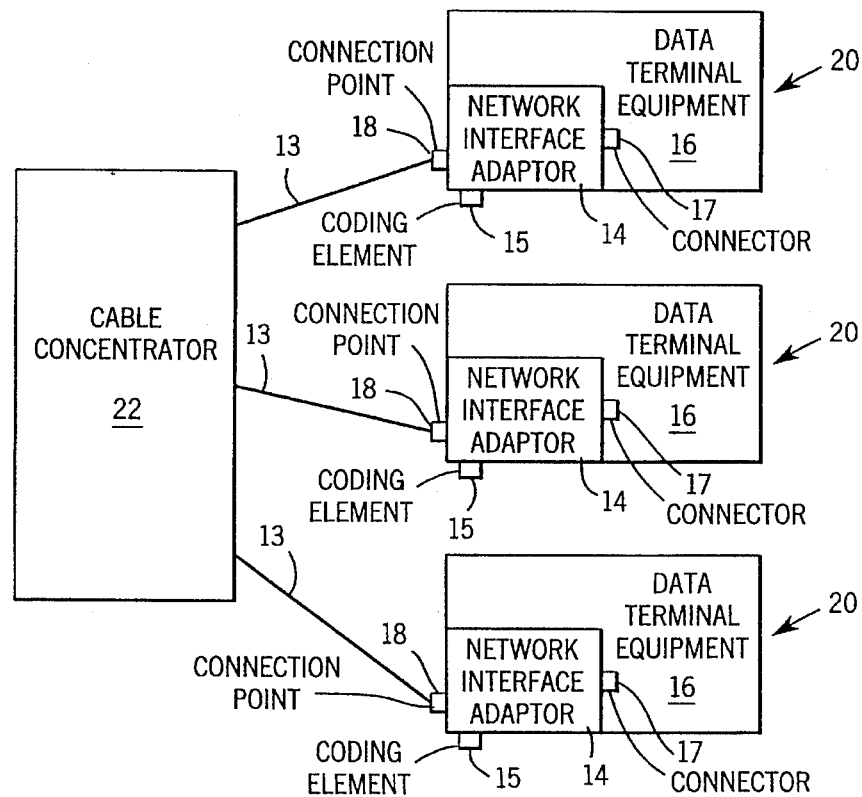
Figure 4C:
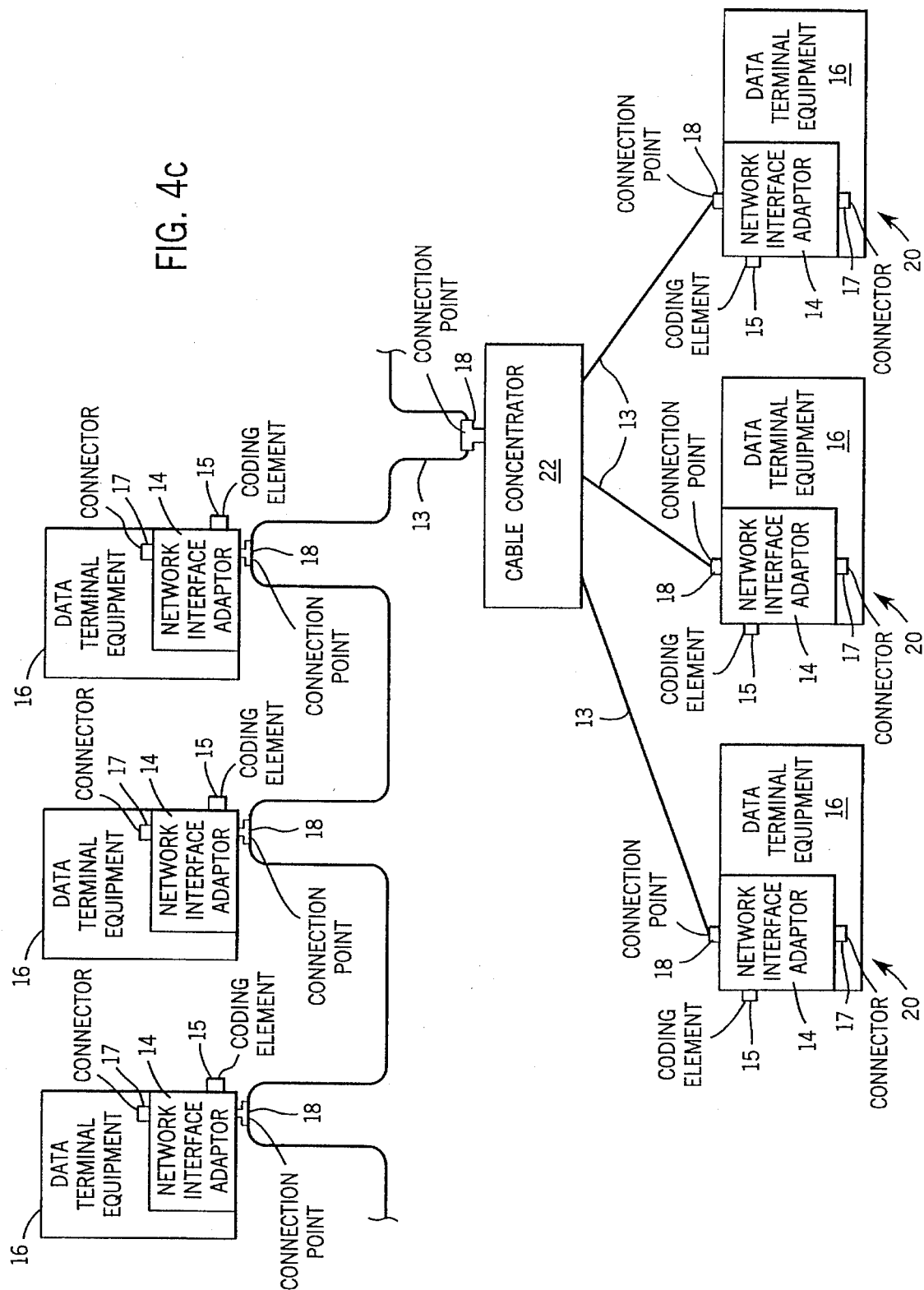

When connecting the data terminal equipment 16 to e.g. the Ethernet data transmission system, the coding element 15 containing the location code is also linked to data terminal equipment 16, which coding element contains the address of the operating site 20 e.g. binary coded in the data terminal equipment 16, as presented in FIG. 4a. When further in the Ethernet communication data field of the data packet sent by the data terminal 16, space is reserved for the location code of the operating site, the control room 10 is at all times aware of the physical location of the data terminals linked to the data network. FIG. 4b–d present some alternative basic drawings for the scattering of the data network in a known way as such into several branches through the cable concentrator "Hub" 22, which operates in FIG. 4b as the star network distributor in the data network 13. A modern concentrator 22 can form networks operating according to different local area network standards and which are differently cabled or to such concentration can be connected intercommunicating data networks according to several local area network standards. FIG. 4c presents one form of implementation of the use of the concentrator 22. FIG. 4d gives an example of a wireless data network 13 between two data terminals 16. In this case the data transmission takes place with radio waves through the antennas 23. Instead of antennas e.g. a infrared receiver/transmitter can be used. These are examples of a wireless data transmission network. In the same location there can be several data terminals, which then usually have the same location code.

The coding element is preferably connected to its operating site by the fixing meons 19, which can be e.g. a chain. Through the fixing meons the coding element can be connected e.g. to the data network 13, when a cable is used and/or to the wall 21, in which cases the coding element remains at the operating site when the data terminal equipment is moved. The coding element is thus preferably detachable from the data terminal equipment 16. Between the data network and the network interface, which is preferably a network interface connector, are provided required connectors, e.g. a BNC-, BNC T or RJ 45 connector. The network interface adapter or card makes the necessary coding and/or signal conversions between the data terminal equipment and the coding element and the network and the data terminal equipment.

In the definition of the operating site locations it is preferable to use a serial access memory instead of coding switches (see pages 479–489 MEMORY PRODUCTS Databook, 2nd Edition, August 1992 SGS-THOMPSON), because in such memory can be saved and from such memory can be read a considerable amount of data describing the operating site, e.g. the cable type used in the data network, the fixed equipment of the treatment site, data encryption, etc. Moreover the set up of the serial access memory interface requires less signal lines than the interface based on coding switches (FIG. 2b).

If the data terminal equipment is connected to the data network without the coding element giving the location code, the computer controlling the data terminal preferably gives a warning about this to the user.

The computer controlling the data terminal equipment is programmed to read the physical location code of the data terminal from the coding element connected to the data terminal, which contains a predefined location address. The equipment and/or control room connected to the data network receive information about the equipment location by reading a certain section in the data field.

According to the invention the data terminal equipment 16 is connected to the connection point 18 of the data network 13, which generally is an adapter, through the network interface adapter or card 14. The network interface adapter has been connected to the data terminal equipment 16 through the connection 17. The network interface adapter can preferably be provided with an interface for the coding element 15, which contains the location data. Instead of using a network adapter, the coding element could in principle be connected to the data terminal equipment with an interface adapter connected to the processor mother board, having parallel registered output and buffer input lines (FIG. 3a and 3b). The network interface adapter can be connected to the processor mother board of the data terminal equipment.

When the data terminal processor has read from the network interface adapter its network code as well as through the network interface adapter the location code from the coding element, the communication transmitted by the data terminal contains the network address data and the equipment location data. The data terminal is in connection with the control room and/or one or several data terminals connected to the network.

Generally when linking into the data network, the network address is read from the network interface adapter, but now is preferably consecutively read into the communication field correspondingly both the network address, which is in its own communication field, and the location data contained in the coding element.

FIG. 5 presents an example of the definition of the location site 20 for the patient monitoring device 16 in a data transmission system. The coding element 15 and the data network 13 are separately linked to the monitoring device. In the patient monitoring device 16 can be measured by different measuring units e.g. the heart rate 30, the heart ventricle pressures 31, temperatures from different spots of the body 33, a blood oxygen saturation value 33, $O_2$ and $CO_2$ when inspired and expired 34, etc. Sensors 30A, 31A, 32A, 33A, 34A have been connected to the measuring units through the cable so that these can be connected to the patient. All this information can be transmitted within the data terminal equipment along the data buses to be processed and forwarded as communications to the network so that the equipment linked to the network knows the location 20 of the devices and the separate measuring units by entering into the communication, e.g. in the way mentioned above, the address of the location When e.g. data from several measuring units is simultaneously transmitted to the network, the location data is put in the beginning of the communication data field and the data of the separate measuring units in a predetermined length in the data fields in sequence. If some measuring unit is not in use, information about this is given e.g. to the control room. This provides the information that a measuring unit connected to the data terminal equipment is free to be moved to another location. The data network communication comprises, as is well known, data fields of different size and for different purpose, as e.g. data about the destination of the packet and the address of the source, the length, the data and the control fields. Certain spaces have been reserved in the data field for the data of each measuring unit, containing i.a. the information of the linking of the unit to the data terminal equipment.

It is especially to be emphasized that while the data transmission has been presented in this application in relation to a patient monitoring device, the method of the invention is applicable also in other fields, in which equipment or measuring devices connected to them are moved and information of their physical location is required.

The system of the invention can be used in different types of networks, in wireless data transmission, etc. The location code can be an Ethernet-address, readable from the coding element. By this the Ethernet-address corresponds to a predetermined location.

In some applications the measuring units linked to the data terminal connected to the network can also send communication directly to the network via the interface adapter. Then the information can be collected centralized or both centralized and decentralized.

The invention has been described with reference to only one of its preferable forms of application. The description above and the drawings are only examples, and the invention is not to be considered as so limited, but all modifications within the scope of the inventive idea defined by the enclosed claims are possible.

What is claimed is:

1. A data transmission system in which the physical location of a data terminal means connected to the system can be identified, said system comprising:

a data transmission network (13) having a plurality of data communication connection points (18) for transmitting and/or receiving data, each of said connection points being located at a physical location served by said data transmission network;

at least one data terminal means (16) connectable to the data transmission network at a selected one of said connection points (18) for receiving and/or transmitting to or from the network; and means for providing, to the data transmission network, an identification of the physical location of the selected connection point to which the data terminal means is connected, said means comprising a coding element (15) located at said selected connection point, said coding element being non-integral with said connection point, said coding element having contained therein an encoded address identifying the physical location of the selected connection point, said coding element being connectable to said data terminal means when said data terminal means is connected to said selected connection point for supplying said encoded address to said data terminal means for provision to the data transmission network as the identification of the physical location of the selected connection point to which the data terminal means is connected, said coding element being non-integral with said connection point when said data terminal means is disconnected from said selected connection point.

2. A data transmission system according to claim 1 wherein said coding element comprises a memory chip.

3. A data transmission system according to claim 1 wherein said coding element comprises a plurality of coding switches.

4. A data transmission system according to claim 1 wherein said coding element is physically retained at said connection point.

5. The data transmission system according to claim 1 wherein said data terminal means senses the presence or absence of a connection of said coding element thereto.

6. A data transmission system according to claim 1 wherein said data transmission network is further defined as a local area network.

7. A data transmission system according to claim 1 wherein said data terminal means provides network address information to said data transmission network so that the physical location of a given data terminal means in the data transmission system can be identified.

8. A data transmission system according to claim 1 wherein said data terminal means further includes at least one sensor means (30–34) coupled to said data terminal means for providing data to said data transmission network.

9. A data transmission system according to claim 8 wherein said data terminal means provides network address information to said data transmission network so that the physical location of a given data terminal means in the data transmission system can be identified.

10. A data transmission system according to claim 9 wherein said data terminal means provides network address information to said data transmission network with respect to said sensor means so that the physical location of said sensor means in the data transmission system can be identified.

11. A data transmission system according to claim 10 wherein said data terminal means provides information to said data transmission network regarding whether said sensor means is in use so that the availability of said sensor means for other uses can be determined.

12. The data transmission system according to claim 1 further including network interface means (14) for connecting said data terminal means (16) to said selected connection point.

13. The data transmission system according to claim 12 wherein said coding element (15) is connected to said network interface means (14).

14. The data transmission system according to claim 1 further including interface means for connecting only said coding element to said data transmission network.

15. The data transmission system according to claim 1 further including:

at least one sensor means (30–34) coupled to said data terminal means for obtaining data relating to the condition of an object; and network interface means (14) for connecting said data terminal means to said selected connection point, one of said network interface means or said data terminal means adapting the data from said sensor means for provision to said data transmission network.

16. The data transmission system according to claim 15 wherein said data terminal means is further defined as means for providing data regarding which sensors are in use.

17. The data transmission system according to claim 13 wherein said network interface means (14) is further defined as means for adapting data for interchange between said data terminal means and said data transmission network, and wherein said coding element is connected to said interface means (14) for connecting said coding element to said data transmission network.

18. The data transmission system according to claim 8 further defined as including a plurality of sensor units, each of which has its own data field in the data provided to said data transmission network.

19. The data transmission system according to claim 1 further defined as including a coding element at a plurality of connection points of said data transmission network.

20. The data transmission network according to claim 1 further defined as including a plurality of data terminal means coupled to selected connection points of said data transmission network, each of said selected connection points having a coding element.

21. A data transmission system according to claim 19 wherein said plurality of data terminal means provide network address information to said data transmission network so that the physical location of said plurality of data terminal means in the data transmission system can be identified.

22. The data transmission system according to claim 8 wherein said sensor means senses the medical condition of a patient and wherein said data provided to said data transmission network comprises medical data.

\* \* \* \* \*